United States Patent [19]

Chikashige

[11] Patent Number: 4,876,615
[45] Date of Patent: Oct. 24, 1989

[54] DATA DECODING SYSTEM

[75] Inventor: Tadaaki Chikashige, Tokyo, Japan

[73] Assignee: Nakamichi Corporation, Tokyo, Japan

[21] Appl. No.: 114,777

[22] Filed: Oct. 30, 1987

[30] Foreign Application Priority Data

Oct. 31, 1986 [JP] Japan .................................. 61-260493

[51] Int. Cl.$^4$ .............................................. G11B 5/09
[52] U.S. Cl. .......................................... 360/43; 360/41
[58] Field of Search ............................ 360/40, 43, 41;
340/347 D–347 O

[56] References Cited

U.S. PATENT DOCUMENTS 4,012,786  3/1977  McKie et al. ........................ 360/43
4,260,952  4/1981  Thomas, Jr. ......................... 360/43
4,267,595  5/1981  Hernandez ........................... 360/43
4,462,051  7/1984  Chan ................................. 360/43
4,503,472  3/1985  Lacher ............................... 360/43

Primary Examiner—Vincent P. Canney
Attorney, Agent, or Firm—Pearne, Gordon, McCoy & Granger

[57] ABSTRACT

A data decoding system for decoding a digital signal stored on a magnetic medium so that one of logical variables "1" and "0" is indicated by a state inversion of signals "H" and "L" at a time interval of a bit cell period, while the other logical variable is indicated by the state inversion at a time interval of half of the bit cell period, wherein a reproduction processing signal is produced having the signal state varying only in response to the state inversion corresponding to one of the logical variables and an NRZ signal is formed by exclusive logical addition of the reproduction processing signal and a delay signal delaying the reproduction processing signal for a time interval of one bit cell period.

6 Claims, 2 Drawing Sheets

DATA DECODING SYSTEM

BACKGROUND OF THE INVENTION

Making the best use of the advantages of the magnetic tape which enables a high speed transmission, a digital magnetic storage and reproduction apparatus having a magnetic tape used therein has been used for backing up a magnetic disk and storing data.

There has been proposed a digital magnetic storage and reproduction system in which digital signals are stored on a magnetic medium so that one of logical variables of one and zero or "1" and "0" is indicated by a state inversion of signals "H" and "L" at a time interval of a bit cell period, while the other logical variable is indicated by the state inversion at a time interval of half of the bit cell period, and only a reproduction signal of one of the digital signals is used for decoding the data, which is disclosed in Japanese Patent Application Laying-Open No. 194,118/1983, for example.

SUMMARY OF THE INVENTION

It is a principal object of the invention to provide a data decoding system adapted to be applied to such a digital magnetic storage and reproduction system as only a reproduction signal of one of the digital signals stored on magnetic media so that one of logical variables "1" and "0" is indicated by a state inversion of signals "H" and "L" at a time interval of a bit cell period, while the other logical variable is indicated by the state inversion at a time interval of half of the bit cell period used for decoding data.

In accordance with the present invention, there is provided a data decoding system for decoding digital signals stored on magnetic media so that one of logical variables "1" and "0" is indicated by a state inversion of signals "H" and "L" at a time interval of a bit cell period, while the other logical variable is indicated by the state inversion at a time interval of half of the bit cell period, said data decoding system characterized in that a reproduction processing signal is produced having the signal state varying only in response to the state inversion corresponding to one of the logical variables, and an NRZ signal is formed by exclusive logical addition of said reproduction processing signal and a delay signal delaying said reproduction processing signal for a time interval of a one bit cell period.

BRIEF DESCRIPTION OF THE DRAWINGS

The above and other objects and features of the invention will be apparent from the description of the embodiments of the invention taken along with the accompanying drawings in which.

DETAILED DESCRIPTION OF THE PREFERRED EMBODIMENT

Figure 1:
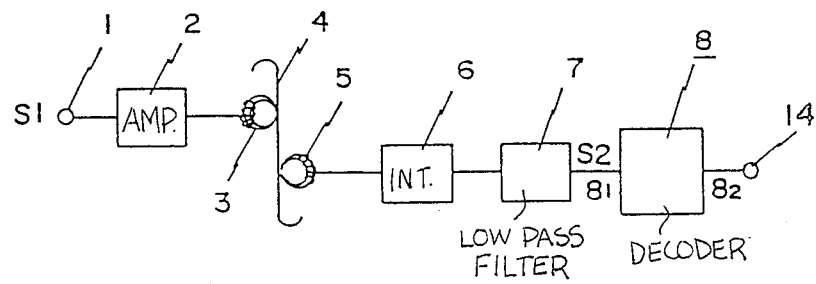
FIG. 1 is a block diagram of a data decoding system in accordance with one embodiment of the invention.
Figure 3:
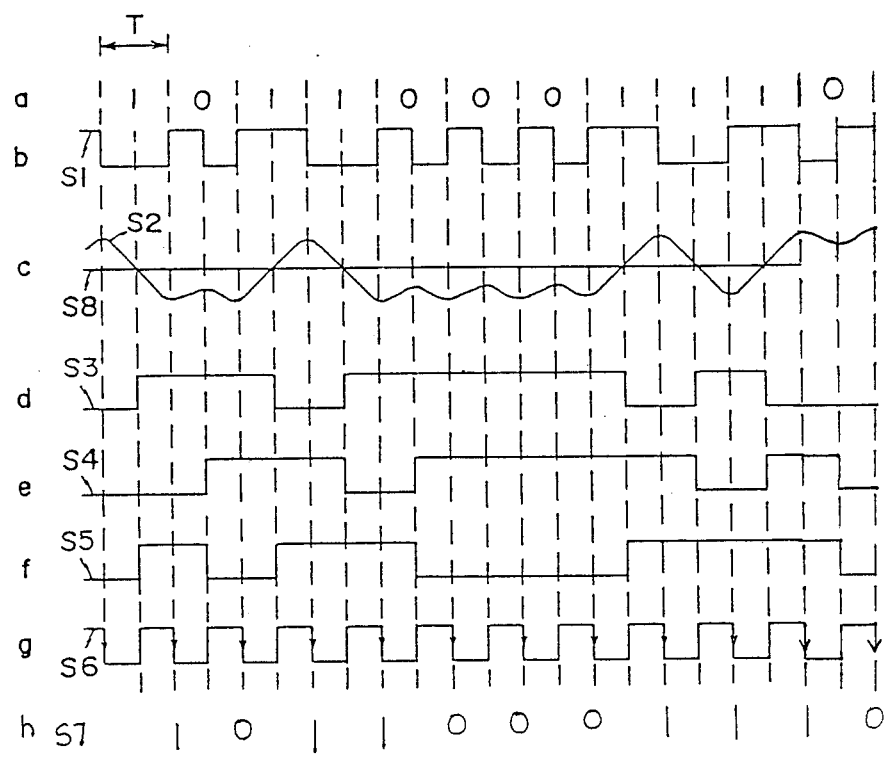
FIG. 3, A through C, illustrates waveforms on portions of the apparatus of FIGS. 1 and 2.

A digital recording signal S1 as shown in FIG. 3 at "b" thereof is applied to an input terminal 1 of a digital magnetic storage and reproduction apparatus of FIG. 1. The digital recording signal S1 is a frequency component f having states of high and low or "H" and "L" inverted at a time interval of a bit cell period T, while the digital data "1 0 1 1 0 0 0 1 0" indicated at a of FIG. 3 have the logical variable of "1" and of frequency component 2f having the states inverted at a time interval of half of the bit cell period when the data have the logical variable of "0".

After the digital recording signal S1 is amplified by a recording amplifier 2 to a predetermined level most suitable for its magnetization on a megnetic tape 4, it is supplied to a recording head 3 to be recorded on the magnetic tape 4.

A reproduction signal of the digital data reproduced by a reproduction head 5 through the magnetic tape 4 has a substantially differential waveform. Then, the reproduction signal passes through an integrator 6 and a low pass filter 7 for attenuating the signal component of frequency 2f relative to the signal component of frequency f to a desired level and thereby is made a reproduction processing signal S2 as indicated at c of FIG. 3, which is applied to an input terminal $8_1$, of a decoder 8. The thus decoded digital data is output from an output terminal $8_2$ of the decoder 8 and then taken out of an output terminal 14.

Figure 2:
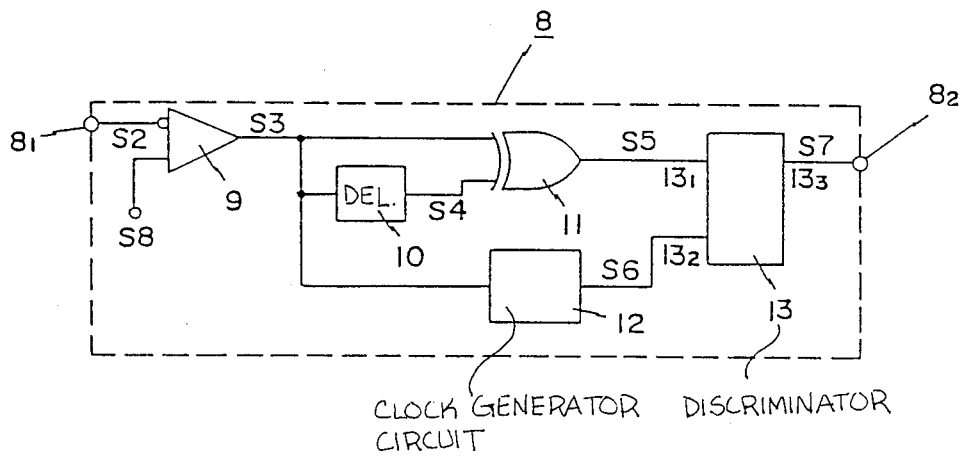
FIG. 2 is a block diagram of a decoder circuit used for the system of FIG. 1.

FIG. 2 illustrates the decoder 8 in detail. The reproduction processing signal $S_2$ applied to the input terminal $8_1$ of the decoder 8 is compared by a comparator 9 with a reference level signal S8 preset to a level of amplitude center to detect a zero crossing of the signal. A processing signal S3 as indicated at d of FIG. 3 is formed having the states of "H" and "L" varying only in response to the inversion based on the logical variable "1".

The processing signal S3 is applied to a delay circuit 10, one input terminal of EX-OR circuit 11 and a clock generator circuit 12, respectively. The delay circuit 10 serves to delay the processing signal S3 by the bit cell period T to produce a delay signal S4 as indicated at e of FIG. 3, which is applied to another input terminal of the EX-OR circuit 11.

The clock generator circuit 12 to which the processing signal S3 is applied generates a data reading clock signal S6 having the period T and synchronizing its phase with the processing signal S3 indicated at d of FIG. 3. The clock signal S6 is applied to a clock input terminal $13_2$ of a digital data discrimination circuit 13.

The discrimination circuit 13 has an input terminal $13_1$ for an NR signal connected to an output terminal of the EX-OR circuit 11 and a data output terminal $13_3$ connected to the output terminal $8_2$ of the decoder 8.

In the aforementioned decoder 8, the EX-OR circuit 11 produces the NRZ signal S5 of digital data "1 0 1 1 0 0 0 1 1 0" including the states of "H" and "L" as indicated at f of FIG. 3 from the exclusive logical addition of the processing signal S3 and the delay signal S4. The digital data discrimination circuit 13 to which the NRZ signal S5 and the clock signal S6 are applied serves to check the state of the NRZ signal S5 when the clock signal comes down to produce a decoded signal S7 of the digital data corresponding to the logical variable "1" in case of "H" condition and the logical variable "0" in case of "L". This decoded signal S7 is shown in FIG. 3h as "1 0 1 1 0 0 0 1 1 0".

Thus, it will be noted that a data decoding system can be easily accomplished by a digital signal being stored on a magnetic medium so that one of logical variables "1" and "0" is indicated by a state inversion of signals "H" and "L" at a time interval of a bit cell period, while the other logical variable is indicated by the state inversion at a time interval of half of the bit cell period and a reproduction signal detected corresponding to one of the logical variables being used.

Although one embodiment of the invention has been illustrated and described with reference to the accompanying drawings, it will be apparent to those skilled in the art that it is by way of example, and that various changes and modifications may be made without departing from the spirit and scope of the invention. For example, the invention may be applied to such a digital recording signal with a frequency component f having states of "H" and "L" inverted at a time interval of a bit cell period T, while the digital data have the logical variable of "O" and of frequency component 2f having the states inverted at a time interval of half of the bit cell period while the data have the logical variable of "1". This would be the same as FIG. 3b with the logic ones and zeroes of FIG. 3a interchanged. It will be understood by those skilled in the art that the invention is defined only by the appended claims.

What is claimed is:

1. A data decoding system for decoding digital signals stored on a magnetic medium so that one of logical variables "1" and "0" is indicated by a state inversion of signals "H" and "L" at a time interval of a bit cell period, while the other logical variable is indicated by a state inversion at a time interval of half of said bit cell period, said data decoding system characterized by:
   means to produce a processing signal having the logic state thereof varying in response to the inversion of the logic state corresponding to only one of said logical variables, and
   means to form an NRZ signal by exclusive logical addition of said processing signal and a delay signal delaying said processing signal for a time interval of one bit cell period.

2. A data decoding system as set forth in claim 1, wherein said means to produce a processing signal has the logic state thereof varying in response to the inversion of the logic state corresponding only to a logic "1".

3. A data decoding system as set forth in claim 1, wherein said means to produce a processing signal has the logic state thereof varying in response to the inversion of the logic state corresponding only to a logic "0".

4. A data decoding system for decoding digital signals of logic "1" and "0" so that one of the logical variables "1" and "0" is indicated by an inversion of the state of high and low signals at a time interval of a bit cell period, while the other logical variable is indicated by an inversion of the state of the high and low signals at a time interval of half of said bit cell period, said data decoding system characterized in that:
   a reproduction processing signal is produced having the logic state of the signal varying in response to the inversion of the logic state corresponding to only one of the logical variables, and an NRZ signal is formed by exclusive logical addition of said reproduction processing signal and a delay signal delaying said reproduction processing signal for a time interval of one bit cell period.

5. A data decoding system for decoding digital signals of logic "1" and "0" so that a logic "1" is indicated by an inversion of the state of high and low signals at a time interval of a bit cell period, while a logic "0" is indicated by an inversion of the state of the high and low signals at a time interval of half of said bit cell period, said data decoding system characterized in that:
   a reproduction processing signal is produced having the logic state of the signal varying in response to the inversion of the logic state corresponding to only a logic "1", and an NRZ signal is formed by exclusive logical addition of said reproduction processing signal and a delay signal delaying said reproduction processing signal for a time interval of one bit cell period.

6. A data decoding system as set forth in claim 4, including a data discriminating circuit to check the state of said NRZ signal at a clock rate having a period equal to said bit cell period.

* * * * *